(12) United States Patent
Roddy et al.

(10) Patent No.: US 7,206,965 B2
(45) Date of Patent: Apr. 17, 2007

(54) SYSTEM AND METHOD FOR PROCESSING A NEW DIAGNOSTICS CASE RELATIVE TO HISTORICAL CASE DATA AND DETERMINING A RANKING FOR POSSIBLE REPAIRS

(75) Inventors: Nicholas Edward Roddy, Clifton Park, NY (US); Anil Varma, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 488 days.

(21) Appl. No.: 10/444,528

(22) Filed: May 23, 2003

(65) Prior Publication Data

US 2004/0250163 A1 Dec. 9, 2004

(51) Int. Cl.
*G06F 11/00* (2006.01)

(52) U.S. Cl. .................................................. 714/25
(58) Field of Classification Search ............... 714/25, 714/47; 707/6, 3, 4
See application file for complete search history.

(56) References Cited

U.S. PATENT DOCUMENTS

| | | | |
|---|---|---|---|
| 5,293,323 A | | 3/1994 | Doskocil et al. |
| 5,463,768 A | * | 10/1995 | Cuddihy et al. ............... 714/37 |
| 6,175,934 B1 | | 1/2001 | Hershey et al. |
| 6,324,659 B1 | | 11/2001 | Pierro |
| 6,336,065 B1 | | 1/2002 | Gibson et al. |
| 6,343,236 B1 | | 1/2002 | Gibson et al. |
| 6,405,108 B1 | | 6/2002 | Patel et al. |
| 6,415,395 B1 | | 7/2002 | Varma et al. |
| 6,442,542 B1 | * | 8/2002 | Ramani et al. ................. 707/3 |
| 6,473,659 B1 | * | 10/2002 | Shah et al. .................... 700/79 |
| 6,480,810 B1 | | 11/2002 | Cardella et al. |
| 6,543,007 B1 | | 4/2003 | Bliley et al. |
| 6,853,389 B1 | * | 2/2005 | Ikeda .......................... 715/790 |
| 6,912,536 B1 | * | 6/2005 | Ochitani ...................... 707/100 |
| 6,917,936 B2 | * | 7/2005 | Cancedda ....................... 707/4 |
| 6,941,321 B2 | * | 9/2005 | Schuetze et al. ........ 707/103 R |
| 6,947,933 B2 | * | 9/2005 | Smolsky ........................ 707/6 |

* cited by examiner

*Primary Examiner*—Robert Beausoliel
*Assistant Examiner*—Amine Riad
(74) *Attorney, Agent, or Firm*—Carlos Hanze; Enrique J. Mora

(57) ABSTRACT

Method and system are provided for processing a new diagnostics case relative to historical case data for a machine undergoing diagnostics. The method allows providing a database storing historical case data for the machine undergoing diagnostics. The method further allows calculating a degree of similarity between the new case and respective cases stored in the database. A list of neighboring cases is determined relative to the new case based on the calculated degree of similarity between the new case and the respective cases stored in the database. The list of neighboring cases is processed to determine a ranking for possible corrective actions for the new case. A corrective action is selected for the new case based on the ranking of the possible corrective actions for the new case.

11 Claims, 1 Drawing Sheet

SYSTEM AND METHOD FOR PROCESSING A NEW DIAGNOSTICS CASE RELATIVE TO HISTORICAL CASE DATA AND DETERMINING A RANKING FOR POSSIBLE REPAIRS

BACKGROUND OF THE INVENTION

The present invention relates generally to diagnostics of railroad locomotives and other self-powered transportation equipment, and, more specifically, to system and method for processing a new diagnostics case relative to historical case data and determine a ranking for possible repairs. This ranking may be used for condensing knowledge gained from screening cases similar to the new case for the type of machine undergoing diagnostics.

A machine, such as a locomotive or other complex systems used in industrial processes, medical imaging, telecommunications, aerospace applications, power generation, etc., includes elaborate controls and sensors that generate faults when anomalous operating conditions of the machine are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences or cases) is applicable to problem solving as learning rules or behaviors. CBR relies on relatively few pre-processing of raw knowledge, focusing instead on indexing, retrieval, reuse, and archival of cases. In the diagnostic context, a case generally refers to a problem/solution description pair that represents a diagnosis of a problem and an appropriate repair. CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach that uses error log data and assumes predefined cases with each case associating an input error log to a verified, unique diagnosis of a problem. In particular, a plurality of historical error logs is grouped into case sets of common malfunctions. From the group of case sets, common patterns, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. Pat. No. 6,343,236, assigned in common to the same assignee of the present invention, discloses system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. Pat. No. 6,415,395, also assigned to the same assignee of the present invention, discloses system and method for analyzing new fault log data from a malfunctioning machine in which the system and method are not restricted to sequential occurrences of fault log entries, and wherein the system and method predict one or more repair actions using predetermined weighted repair and distinct fault cluster combinations.

Additionally, U.S. Pat. No. 6,336,065, assigned to the same assignee of the present invention, provides system and method that uses snapshot observations of operational parameters from the machine in combination with the fault log data in order to further enhance the predictive accuracy of the diagnostic algorithms used therein. That invention further provides noise reduction filters, to substantially eliminate undesirable noise, e.g., unreliable or useless information that may be present in the fault log data and/or the operational parameter data.

It is believed that the inventive concepts disclosed in the foregoing patents provide substantial advantages and advancements in the art of computerized diagnostics. However, the case-based reasoning tools described in the foregoing patents generally rely on associating probabilistic outcomes with individual features of a given case. The calculation of these probabilistic outcomes may be somewhat time consuming, as may be identification of relevant features within a new case. In addition, not all features have the same amount of reliability and history associated with them, and calculating their probabilistic relevance based on limited data could lead to inaccurate outcomes.

BRIEF SUMMARY OF THE INVENTION

To address the issues identified in the background section of the present invention, as well as introduce improved diagnostics functionality in a diagnostics systems, such as a case-based reasoning system, it is desired to provide an improved algorithm that does not rely on limited case features but on a composition of an entire sample of historical cases. Accordingly, it would be desirable to determine a degree of similarity for a new diagnostics case relative to a broad spectrum of cases. It would be further desirable to provide improved accuracy at a repair code level (as well as a recommendation level) in order to assign an improved confidence value to a diagnostics solution.

Generally, the present invention fulfills the foregoing needs by providing in one aspect thereof, a method for processing a new diagnostics case relative to historical case data for a machine undergoing diagnostics. The method allows providing a database storing historical case data for the machine undergoing diagnostics. The method further allows calculating a degree of similarity between the new case and respective cases stored in the database. A list of neighboring cases is determined relative to the new case based on the calculated degree of similarity between the new case and the respective cases stored in the database. The list of neighboring cases is processed to determine a ranking for possible corrective actions for the new case. A corrective action is selected for the new case based on the ranking of the possible corrective actions for the new case.

In another aspect thereof, the present invention further fulfills the foregoing needs by providing a system for processing a new diagnostics case relative to historical case data for a machine undergoing diagnostics. The system includes a database for storing historical case data for the machine undergoing diagnostics. A processor may be configured to calculate a degree of similarity between the new case and respective cases stored in the database. A processor may be configured to determine a list of neighboring cases relative to the new case based on the calculated degree of similarity between the new case and the respective cases stored in the database. A processor may be configured to process the list of neighboring cases to determine a ranking for possible corrective actions for the new case, wherein the system allows selecting a corrective action for the new case based on the ranking of the possible corrective actions for the new case. The foregoing processors may comprise modules in a single processor device or may comprise separate processors.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
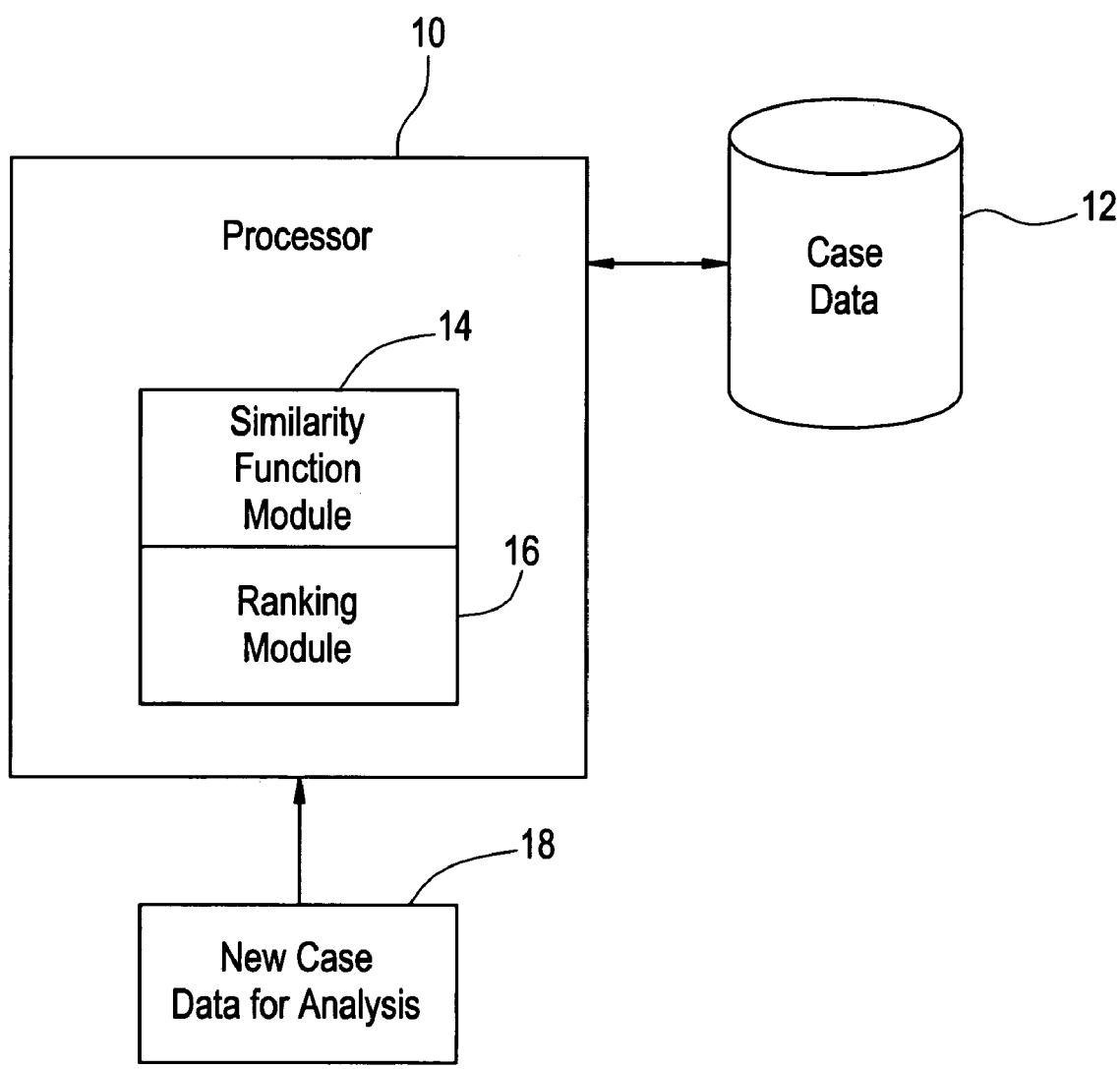
FIG. 1 is a block diagram of an exemplary diagnostics system embodying aspects of the present invention.

FIG. 1 is a block diagram of an exemplary system embodying aspects of the present invention for processing a new diagnostics case relative to historical case data and determine a ranking (e.g., a relative ranking) for possible repairs. As used herein, a case generally refers to a problem/solution description pair that represents a diagnosis of a problem and an appropriate repair.

A processor 10 is coupled to a database 12 that may comprise a plurality of cases applicable to a machine undergoing diagnostics. For example, a plurality of historical cases for a given type of locomotives. In one exemplary embodiment, the processor includes a module 14 configured to calculate a similarity function.

Exemplary diagnostic cases stored in database 12 may be arranged as represented in Table 1 below:

TABLE 1

| Case ID | Faults | Operational Parameters | | | | | | | | | | | |
|---|---|---|---|---|---|---|---|---|---|---|---|---|---|
| A | 73 | IMC | 13.23 | 443 | 2 | 165.15 | 2 | 0 | 400 | 308 | 165 | 168 | 3 | 133705.28 |
| B | 73 | IMC | 13.23 | 443 | 2 | 163.68 | 2 | 0 | 403 | 303 | 165 | 168 | 3 | 133705.28 |
| C | 73 | IMC | 13.25 | 455 | 2 | 162.6 | 2 | 0 | 403 | 301 | 165 | 168 | 3 | 133705.28 |

A new case received for diagnostics analysis could be as represented in Table 2 below:

TABLE 2

| D | 73 | IMC | 13.23 | 443 | 2 | 163.68 | 2 | O | 403 | 303 | 165 | 168 | 3 | 133705.28 |
|---|---|---|---|---|---|---|---|---|---|---|---|---|---|---|
| E | 73 | IMC | 13.25 | 455 | 2 | 162.6 | 2 | O | 403 | 301 | 165 | 168 | 3 | 133705.28 |
| F | 70 | CTS | 0 | 0 | 1 | 0 | 0 | O | 0 | 0 | 62 | 62 | 0 | 134250.36 |

Generally, the objective of the similarity function is to arrive at some indication (e.g., a number, alphanumeric code, linguistic label, etc.) indicative of the degree of similarity between any two cases. Assuming a numerical indication, the value of the number indicating the degree of similarity between two cases may conceptually range from 0 to 1, where a zero value would indicate that the two cases are completely different and a unity value would indicate that they are identical. In one exemplary embodiment, the similarity function may operate as follows:

Let us introduce a parameter $\lambda$ that influences how much importance is given to the frequency or repetition of a fault commonly shared by the two cases that are being matched or compared. If the value of the parameter $\lambda=1$, this would indicate that the frequency of a fault is not considered at all while calculating a similarity match between the two cases. For example, fault 73 may occur 2 times in a first case and 20 times in a second case. Assuming $\lambda=1$, then the contribution of fault 73 to the degree of similarity would be 100% since in this example one would simply determine that the same fault 73 occurred in both cases.

However, if $\lambda=0$, the degree of similarity would be entirely dependent on the frequency of fault matching between the two cases. Assuming $\lambda=1$, then, in the foregoing example, the degree of similarity contributed by fault 73 would be 2/20=0.1, or 10%.

In one exemplary embodiment, an appropriate choice for the value of $\lambda$ may be determined through experiments and/or simulations configured to maximize the performance of the similarity function algorithm for any given application. As stated above, the value of $\lambda$ may be as follows: $\lambda \in \{0,1\}$ Let us say there are two cases—

| Case 1 | |
|---|---|
| Faults | Frequency |
| F1 | 10 |
| F2 | 1 |

| Case 2 | |
|---|---|
| Faults | Frequency |
| F1 | 1 |
| F2 | 10 |

A question that may arise may be—what is the degree of similarity between Case 1 and Case 2.

If one were to ignore the frequency column altogether, the information conveyed by the cases might appear as follows:

| Case 1 |
| --- |
| Faults |
| F1 |
| F2 |

| Case 2 |
| --- |
| Faults |
| F1 |
| F2 |

The number of common faults=Sum=2.   Eq. (1)

Number of distinct faults in Case1=2
Number of distinct faults in Case2=2

Therefore, based on the foregoing assumptions, the degree of similarity for this situation could be calculated as follows:

Degree of similarity=[Number of common faults]$^2$/{[Number of distinct faults in Case1]*[Number of distinct faults in Case2]}=1

If one were to consider the frequency column to be a substantial factor for calculating the degree of similarity for the same two cases, the information from these two cases may be evaluated as follows:

| Case 1 | |
| --- | --- |
| Faults | Frequency |
| F1 | 10 |
| F2 | 1 |

| Case 2 | |
| --- | --- |
| Faults | Frequency |
| F1 | 1 |
| F2 | 10 |

For this situation, the degree of similarity contributed by fault F1=1/10 =0.1 and the degree of similarity contributed by fault F2=1/10=0.1

One may use this information to modify or adjust the original sum calculation in Eq. (1) above. The original sum calculation was:

Sum=2=1(F1)+1(F2)

One may adjust the contribution of each shared fault based on its respective degree of similarity taking into account information from the frequency column. The adjusted calculation becomes, Sum=0.2=0.1(F1)+0.1 (F2).

The foregoing exemplary calculations should illustrate that the value of Sum for determining the value of the similarity function for these straightforward examples can vary between 0.2 and 2, depending on whether or not one chooses to consider to a full extent the frequency of occurrence of common faults in the two cases being compared.

Let us introduce the parameter a, which allows one to quantitatively modulate or calibrate the effect of fault frequency somewhere between the two diametrically opposite situations described above. That is, either ignoring fault frequency or fully considering fault frequency.

Let Sum=$a$+(1−$a$)*Similarity based on Frequency.

In the foregoing example, if the value of parameter a=0.7, then

Sum=[0.7+0.3*0.1](F1)+[0.7+0.3*0.1](F2)=1.46

For a general situation, let us assume the ith case Ci comprises a plurality of faults Fi, let us further assume the jith case Cj comprises a plurality of faults Fj:

For each fault Fi in {Ci U Cj},

If $Fi \in \{Ci\}$ & $\epsilon Fi\{Cj\}$ then sum=$a$+(1−$a$)*{[Min(count(Fi), count(Fj)]/[Max(count(Fi), count(Fj)]} a) Similarity $S = \sqrt{\dfrac{[\text{sum}]^2}{\text{Count}[\{Fi\}] \times \text{Count}[\{Fj\}]}}$ Where Count(Fi) is the number of distinct faults in the ith Case, and Count(Fj) is the number of distinct faults in the jth Case.

This would result in an output (e.g., ordered listing) of all cases that have non-zero similarity (or at least have a similarity numerical value above a preset threshold value) relative to a new case (e.g., a 'probecase'). An example of such an output may be as shown in Table 3 below, where each case happens to have the same degree of similarity relative to the probecase.

TABLE 3

Recommendation Code   Repair Code

| Probecase : C53   9109   1989   Cables, Terminals - Traction Motor |
| --- |
| Neighbors |
| 37.0%   95 9109   1867   TM1 - Traction Motor (AC) |
| 37.0%   95 9109   1868   TM2 - Traction Motor (AC) |
| 37.0%   95 9109   1869   TM3 - Traction Motor (AC) |
| 37.0%   C000953   9109   1871   TM5 - Traction Motor (AC) |

B) Ranking Function:

In one exemplary embodiment, processor 10 further includes a module 16 for synthesizing the plurality of neighboring cases from the similarity function module 14 into a ranked output of cases (e.g., a relative ranking of cases). Since, in general, the output of the similarity function module is a list of neighboring cases, it is plausible that at least some of these cases may have the same repair code or recommendation associated with them. This is especially true if the new case is of a type that is frequently observed or detected. An example of such an output exhibiting cases with varying degrees of similarity is shown below in Table 4.

TABLE 4

Before Rollup
Probecase: 132 185 1681 SS6 - Traction Motor Speed Sensor 6 Neighbors

| | | | | | |
|---|---|---|---|---|---|
| 100.0% | 1345 | 185 | 1681 | SS6 | Traction Motor Speed Sensor |
| 100.0% | 1788 | 185 | 1681 | SS6 | Traction Motor Speed Sensor |
| 100.0% | 1820 | 185 | 1681 | SS6 | Traction Motor Speed Sensor |
| 100.0% | 2990 | 185 | 1681 | SS6 | Traction Motor Speed Sensor |
| 81.0% | 1705 | 5303 | 1520 | CGS | Air Compressor Switch |
| 60.0% | 1915 | 185 | 1681 | SS6 | Traction Motor Speed Sensor |
| 57.0% | 2560 | 185 | 1681 | SS6 | Traction Motor Speed Sensor |
| 56.0% | 0715 | 185 | 1681 | SS6 | Traction Motor Speed Sensor |
| 56.0% | 2944 | 185 | 1681 | SS6 | Traction Motor Speed Sensor |
| 50.0% | 2312 | 185 | 1681 | SS6 | Traction Motor Speed Sensor |
| 50.0% | 2882 | 185 | 1681 | SS6 | Traction Motor Speed Sensor |
| 50.0% | 2905 | 185 | 1872 | TM6 | Traction Motor (AC) |
| 33.0% | 1179 | 185 | 1681 | SS6 | Traction Motor Speed Sensor |
| 32.0% | 4284 | 185 | 1681 | SS6 | Traction Motor Speed Sensor |

In order to process the output from the similarity function module 14 into one that selectively categorizes distinct diagnoses, one may use a ranking function, also colloquially referred to as a "rollup function." The basic concept behind the rollup function is to perform a discounted voting solution to condense multiple cases pointing to the same diagnosis and boost their relative rank up and associate a more statistically meaningful confidence level for such cases. Since the voting is aggregated, it is possible that a final aggregated result for a given case may be greater than 100%. This may mean that the new case not only matches one single archived case, but also matches well with many archived cases. See, for example, Table 5 that includes an exemplary listing condensing the rankings for the distinct diagnosis identified in Table 4.

TABLE 5

After Rollup

| | | | | | |
|---|---|---|---|---|---|
| 285.0% | 1345 | 185 | 1681 | SS6 | Traction Motor Speed Sensor 6 |
| 81.0% | 1705 | 5303 | 1520 | CGS | Air Compressor Gov Press Switch |
| 50.0% | 2905 | 185 | 1872 | TM6 | Traction Motor (AC) |

In one exemplary embodiment, the rollup algorithm may comprise the following instructions:
Rci=repair code for case at ranking i.
Mi=Match percentage for case at rank i.
N=total number of neighbor cases.
β=damping factor
For (i=1; i<n; i++)
{for (j=1; j<=n; j++)}
{if((Rci=Rcj) and Neighbor j is not disabled)}
{Mi=Mi+1/(j−i+β)*Mj; Disable Neighbor j}
The same process can be repeated for assessing the ranking by recommendations in lieu of repair code.

Intuitive Plain English Explanation of the Rollup Function:

There are at least two basic ways for a recommendation to climb (or to "rollup") to the top of the list. The first would be to have a very high match percentage, indicating that there is an excellent match. See for example in Table 4 the recommendations with 100 percent match. However, this begs the question: What does one do in situations when one has to decide, for example, between a single recommendation R1 with a relatively high numerical match (e.g., a 0.9 match) and several recommendations with a relatively lower numerical match (e.g., 10 matched recommendations of type R2 with a 0.75 match)? One would want to integrate this information and provide a combined or partial credit for these types of situations. That is, one would like to quantitatively account for a broad spectrum of situations, such as a) situations with relatively high numerical match with one (or just a few) recommendation/s, and b) situations with a relatively lower numerical match but with a relatively large number of past occurrences. That is, situations with a relatively lower numerical match yet based on substantial precedential value from previous cases. This combined crediting is what the rollup function is configured to perform.

Let us assume a raw match output as in Table 6 below:

TABLE 6

| Rank | Recommendation | Degree of Match |
|---|---|---|
| 1 | R1 | 0.71 |
| 2 | R2 | 0.7 |
| 3 | R3 | 0.5 |
| 4 | R4 | 0.4 |

One would want to reflect the fact that recommendation R2 is found twice (e.g., at Ranks 2 and 4), and thus give recommendation R2 credit for that fact. In this example, one may perform this adjustment by combining with the Degree of Match of repair R2 at Rank 2, the degree of match of repair R2 at Rank 4, reduced by a discounting factor. In this example, this factor would be 1/(difference in ranks+degree of damping).

Assuming the degree of damping is 3, then the computation of the combined relative ranking becomes $$1/(4-2+3)=0.20$$

So the degree of match of R2 at rank2 will be updated as =0.7+(0.20)*(0.4)=0.78

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for processing a new diagnostics case relative to historical case data for a machine undergoing diagnostics, the method comprising:
   providing a database storing historical case data for the machine undergoing diagnostics;
   calculating a degree of similarity between the new case and respective cases stored in the database;
   determining a list of neighboring cases relative to the new case based on the calclated degree of similarity between the new case and the respective cases stored in the database;
   processing the list of neighboring cases to determine a ranking for possible corrective actions for the new case; and
   selecting a corrective action for the new case based on the ranking of the possible corrective actions for the new case, wherein the calculated degree of similarity (S) is based on the following equation, $$S = \sqrt{\frac{[\text{sum}]^2}{\text{Count}[\{Fi\}] \times \text{Count}[\{Fj\}]}},$$

wherein if a fault $Fi \in \{Ci\}$ & $\in Fi\ \{Cj\}$, then sum=a+(1−a)*{[Min(count(Fi), count(Fj)]/[Max(count(Fi), count(Fj)]}, count(Fi) is a number of distinct faults in the ith Case, and Count(Fj) is a number of distinct faults in the jth case, and a is a parameter having a value between zero and one for weighing a frequency of occurrence of faults shared in common between any two cases whose degree of similarity is being calculated.

2. The method of claim 1 wherein the ranking for possible corrective actions for the new case is based, at least in part, on a rank difference between respective ones of the possible corrective actions.

3. The method of claim 1 wherein the ranking of the possible corrective actions is a relative ranking among the possible corrective actions.

4. A method for processing a new diagnostics case relative to historical case data for a machine undergoing diagnostics, the method comprising:
   providing a database storing historical case data for the machine undergoing diagnostics;
   calculating a degree of similarity between the new case and respective cases stored in the database;
   determining a list of neighboring cases relative to the new case based on the calculated degree of similarity between the new case and the respective cases stored in the database;
   processing the list of neighboring cases to determine a ranking for possible corrective actions for the new case; and
   selecting a corrective action for the new case based on the ranking of the possible corrective actions for the new case, wherein the ranking for possible corrective actions for the new case is based one the following equation for $(i=1; i<n; i=i+1)$ and for $(j=i+1; j<=n; j=j+1)$, $\{\text{if}((Rci=Rcj)\}, \text{then } \{Mi=Mi+1/(j-i+\beta)*Mj\}$ wherein Rci represents a corrective action for a case at rank i, Rcj represents a corrective action for a case at rank j, Mi represents a match percentage for the case at rank i, Mj represents a match percentage for the case at rank j, N represents a total number of neighboring cases, and β represents a predefined damping factor.

5. The method of claim 4 wherein the degree of similarity is a numerical determination.

6. The method of claim 4 wherein the degree of similarity is based, at least in part, on a frequency of occurrence of faults shared in common between the new case and the respective cases stored in the database.

7. A system for processing a new diagnostics case relative to historical case data for a machine undergoing diagnostics, the system comprising:
   a database storing historical case data for the machine undergoing diagnostic;
   a processor configured to calculate a degree of similarity between the new case and respective cases stored in the database;
   a processor configured to determine a list of neighboring cases relative to the new case based on the calculated degree of similarity between the new case and the respective cases stored in the database, wherein the calculated degree of similarity (S) is based on the following equation, $$S = \sqrt{\frac{[\text{sum}]^2}{\text{Count}[\{Fi\}] \times \text{Count}[\{Fj\}]}},$$

wherein if a fault $Fi \in \{Ci\}$ & $\in Fi\ \{Cj\}$, then the sum=a+(1−a)*{[Min(count(Fi), count(Fj)]/[Max(count(Fi), count(Fj)]}, count(Fi) is a number of distinct faults in the ith Case, and count (Fj) is a number of distinct faults in the jth case, and a is a parameter having a value between zero and one for weighing a frequency of occurrence of faults shared in common between any two cases whose degree of similarity is being calculated; and
   a processor configured to process the list of neighboring cases to determine a ranking for possible corrective actions for the new case, wherein the system selects a corrective action for the new case based on the ranking of the possible corrective actions for the new case.

8. The system of claim 7 further comprising a processor configured to calculate a relative ranking among the possible corrective actions.

9. The system of claim 7 wherein said processors are modules of a single processor device.

10. A system for processing a new diagnostics case relative to historical case data for a machine undergoing diagnostics, the system comprising:
    a database storing historical case data for the machine undergoing diagnostics;
    a processor configured to calculate a degree of similarity between the new case and respective cases stored in the database;
    a processor configured to determine a list of neighboring cases relative to the new case based on the calculated degree of similarity between the new case and the respective cases stored in the database; and
    a processor configured to process the list of neighboring cases to determine a ranking for possible corrective actions for the new case, wherein the system selects a corrective action for the new case based on the ranking of the possible corrective actions for the new case, wherein the ranking for possible corrective actions for the new case is based one the following equation for $(i=1; i<n; i=i+1)$ and for $(j=i+1; j<=n; j=j+1)$, $\{\text{if}((Rci=Rcj)\}, \text{then } \{Mi=Mi+1/(j-i+\beta)*Mj\}$, wherein Rci represents a corrective action for a case at rank i, Rcj represents a corrective action for a case at rank j, Mi represents a match percentage for the case at rank i, Mj represents a match percentage for the case at rank j, N represents a total number of neighboring cases, and β represents a predefined damping factor.

11. The system of claim 10 further comprising a processor configured to calculate a numerical degree of similarity.

* * * * *